(12) United States Patent
Carlsten et al.

(10) Patent No.: US 10,948,589 B1
(45) Date of Patent: Mar. 16, 2021

(54) BI-STATIC AND MONO-STATIC SYNTHETIC APERTURE RADAR (SAR) IMAGING USING A SHORT-PULSE LASER

(71) Applicant: Triad National Security, LLC, Los Alamos, NM (US)

(72) Inventors: Bruce Carlsten, Los Alamos, NM (US); David Thompson, Los Alamos, NM (US); David Palmer, Los Alamos, NM (US)

(*) Notice: Subject to any disclaimer, the term of this patent is extended or adjusted under 35 U.S.C. 154(b) by 334 days.

(21) Appl. No.: 15/798,171

(22) Filed: Oct. 30, 2017

Related U.S. Application Data

(60) Provisional application No. 62/418,317, filed on Nov. 7, 2016.

(51) Int. Cl.
*G01S 13/90* (2006.01)
*G01S 13/00* (2006.01)
*G01S 7/295* (2006.01)

(52) U.S. Cl.
CPC ............ *G01S 13/904* (2019.05); *G01S 7/295* (2013.01); *G01S 13/003* (2013.01); *G01S 13/9058* (2019.05)

(58) Field of Classification Search
CPC ............................... G01S 13/904; G01S 7/295
See application file for complete search history.

(56) References Cited

U.S. PATENT DOCUMENTS

| | | | |
|---|---|---|---|
| 5,566,382 A * | 10/1996 | Worchesky | G01S 13/9005 342/25 A |
| 2004/0125835 A1 * | 7/2004 | Halmos | H01S 3/105 372/26 |
| 2013/0044023 A1 * | 2/2013 | Sanyal | G01S 7/40 342/194 |
| 2014/0195150 A1 * | 7/2014 | Rios | B64C 39/024 701/469 |
| 2017/0031012 A1 * | 2/2017 | Hairston | G01S 7/497 |

* cited by examiner

*Primary Examiner* — Marc Anthony Armand
(74) *Attorney, Agent, or Firm* — LeonardPatel PC

(57) ABSTRACT

SAR imaging may be performed using a short-pulse laser to generate range-resolved reflection data. A short-pulse laser may be advantageous over other techniques to acquire the range-resolved data, especially in cases with very distant targets or other cases with low signal-to-noise ratio information, because a short-pulse laser can determine the range to individual reflectors with a single photon return and is more adaptable to a photon-starved inversion algorithm. This technique can be used with both mono-static and bi-static SAR configurations.

20 Claims, 8 Drawing Sheets

RELATED ART

RELATED ART

RELATED ART

BI-STATIC AND MONO-STATIC SYNTHETIC APERTURE RADAR (SAR) IMAGING USING A SHORT-PULSE LASER

CROSS-REFERENCE TO RELATED APPLICATION

This application claims the benefit of U.S. Provisional Patent Application No. 62/418,317 filed Nov. 7, 2016. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to radar, and more particularly, to bi-static and mono-static synthetic aperture radar (SAR) imaging using a short-pulse laser.

BACKGROUND

The most common form of imaging radar is SAR. Carl Wiley of the Goodyear Corporation, a legacy company of Lockheed Martin, invented the SAR concept in 1952. The first airborne SAR was flown on a DC-3 in 1953. Since then, SAR has become a ubiquitous imaging technique, capable of all-weather sub-meter resolution imaging.

In conventional SAR systems, the radar generates radio frequency (RF) images with near-optical quality by coherently integrating the return of a frequency-chirped radar as it travels over some distance in order to form a synthetic aperture for the antenna. Conventional SAR employs a transmitted radio frequency (RF) signal with a frequency chirp to interrogate a target region (i.e., a patch) at different angular views. Target reflections (i.e., a reflected RF signal) lead to a received signal, and the image is formed from the phase information from the received signal. Basically, the bandwidth B of a SAR resolves range, with a resolution of $$S_{range} = \frac{c}{2B} \quad (1)$$

where c is the speed of light.

In the case of a conventional "spotlight-mode" SAR, the radar stays pointed at the center of a target patch. The different views typically result from the radar traveling by the target on a path, as shown in FIG. 1, which is a schematic diagram 100 illustrating spotlight-mode SAR parameters and definitions using a plane-based SAR. A target patch on the ground is interrogated at some distance orthogonal to a flight path. The direction away from the flight path is called "down-range" and the direction on the ground parallel to the flight path is called "cross-range." The SAR transmits at a frequency that chirps through a frequency bandwidth. Each chirp occurs very fast, and for simplicity, the plane can be considered stationary during the chirp since the distance traveled between chirps is very small. These chirps are repeated as the plane moves through discrete angular positions along the flight path relative to the target patch center, with a chirp and the associated reflected signal received at these specific angular locations.

For a conventional spotlight mode SAR, phase interferometry is used to resolve cross-range, with a cross-range resolution of $$S_{cross-range} = 1.22 \frac{\lambda R}{S} \quad (2)$$

where $\lambda$ is the wavelength of the SAR's center frequency, S is the distance along the path over which the different angular views are taken, and R is the distance from the path to the target (known as the offset). Phase interferometry requires that there is a negligible phase drift in the carrier frequency over the entire viewing path with length S, on the order of 45° or less.

In a conventional spotlight mode SAR, at each angular location, the received data is mixed with the transmission signal (i.e., a carrier) as a function of the chirped frequency, both in-phase (resulting in the in-phase signal I) and out-of-phase (resulting in the quadrature signal Q). In other words, the radar return is mixed with the in-phase and out-of-phase transmit signal, which gives I and Q. A key aspect of SAR is that the constructed quantity I+jQ is very nearly the two-dimensional Fourier transform $G(k_x,k_y)$ of the target's scattering function (also known as the reflection function), defined as g(x,y), where (x=0, y=0), defines the center of the target, since twice the angular frequency divided by the speed of light, $4\pi f/c$, is the wavenumber k (the Fourier transform of real space).

The quantity I+jQ can be inverted to approximately find the reflection function g(x,y) within the target patch. Importantly, this inversion can be thought of as first integrating along the direction of view (known as "de-ramping" because the Fourier integral is over the frequency chirp) and then integrating along the angular spread of the wavenumber (which, from a fundamental theory of Fourier transforms, is the same angle as the physical viewing angle). The first de-ramping integral identifies the distance to the reflectors in the target patch, but cannot resolve their relative cross-range positions.

The de-ramping process bins down-range locations into "range cells", shown as lines along the target patch in FIG. 1. These cells are the width of the SAR's range resolution. For example, points A and B in FIG. 1 would be indistinguishable from the de-ramping process. Importantly, each return signal from each range cell has a phase of I and Q associated with the offset of that position from the target patch center. The second Fourier integral is equivalent to an integral correlating these phases of each individual reflector, which change as the angular view changes.

The resolution of the SAR image (i.e., the range cell size) in the down-range direction is 2B/c, where B is the SAR's frequency bandwidth and the resolution in the cross-range direction is the SAR's carrier wavelength divided by the total angular view on the target ($\lambda/\theta$, in radians). To get fine down-range resolution, a very high bandwidth is needed. To get fine cross-range resolution, both a small carrier wavelength and a large angular view of the target patch are needed. Increasing the carrier frequency leads to increased phase drift over the viewing path and increased bandwidth leads to increased deviation of I+jQ from $G(k_x,k_y)$, known as phase distortion. Combined, these effects lead to fundamental limitations for conventional spotlight SARs in achieving very fine resolution of targets that need long integration paths due to large offset distances.

Here, and in the following example, two-dimensional scattering and imaging is considered. The extension to three dimensions is straightforward and follows the conventional extension for three-dimensional SAR algorithms. The domain of the constructed quantity $G(k_x,k_y) \approx I+jQ$ in Fourier space is shown in graph 200 of FIG. 2.

Note that the Fourier-space wavenumbers appear through the frequency chirp, i.e., $k_x=(4\pi f/c) \cos \theta$ and $k_y=(4\pi f/c) \sin \theta$, where $f$ is the transmit frequency and $\theta$ is the view angle (which is the same angle in Fourier space by the Slice Projection Theorem). The Fourier transformed scattering function is $$G(k_x, k_y) = \frac{1}{2\pi} \int_{-\infty}^{\infty}\int_{-\infty}^{\infty} g(x, y)e^{-j(xk_x+yk_y)}dxdy \quad (3)$$

and the original scattering function can be recovered from $$g(x, y) = \frac{1}{2\pi} \int_{-\infty}^{\infty}\int_{-\infty}^{\infty} G(k_x, k_y)e^{-j(xk_x+yk_y)}dk_xdk_y \quad (4)$$

However, the approximation of $G(k_x,k_y)$ is not known over the entire k-space. Rewriting in polar coordinates to indicate the limits of the received SAR data, the reconstructed scattering image using direct Fourier inversion is then given by $$f(x, y) = \frac{1}{2\pi} \int_{\pi/2-\theta_0}^{\pi/2+\theta_0} \int_{k_{min}}^{k_{max}} G(k, \theta)e^{-j(xk\cos\theta+yk\sin\theta)}kdkd\theta \quad (5)$$

where $k_{min}$ and $k_{max}$ are respectively given by $4\pi(f_c-B/2)/c$ and $4\pi(f_c+B/2)/c$ functions of the carrier frequency $f_c$ and the bandwidth B, and the angular views extend from $\pi/2-\theta_0$ to $\pi/2+\theta_0$. Note that $(x \cos \theta + y \sin \theta)$ is the distance $\delta_{x,y}$ of (x,y) projected onto the view angle from the target center with the geometry shown in FIG. 3. The function $f$ can be rewritten as $$f(x, y) = \frac{1}{2\pi} \int_{\pi/2-\theta_0}^{\pi/2+\theta_0} \int_{k_{min}}^{k_{max}} G(k, \theta)e^{-jk\delta_{x,y}}kdkd\theta \quad (6)$$

There are several approaches for reconstructing the scattering image, including polar reformatting and convolution backprojection (CBP) for direct Fourier inversion. Additionally, standard inversion techniques like the Maximum Entropy Method can be used to improve on the direct Fourier inversion. In polar reformatting, the data in Fourier space is first interpolated onto a Cartesian grid and then a Cartesian two-dimensional FFT is performed to recover $f(x,y)$, requiring $O(N^2 \log N)$ operations for an N×N SAR image. In CBP, $f(x,y)$ is directly calculated from Eq. (6) using the polar coordinates, typically requiring $O(N^3)$ operations. Since FFTs require a Cartesian frame, non-FFT Fourier transforms need to be numerically completed for CBP. Several schemes have been proposed to reduce the complexity of the CBP approach down to $O(N^2 \log N)$. Despite the typically larger computational complexity, CBP has the advantage that the image can be initially formed with few angular views and continually improved as more views are added, making it especially attractive to applications where limited computer memory is available.

A significant issue with conventional spotlight SAR is that it requires phase coherency of the transmitter over the entire pass over the target. For relatively high radar frequencies, such as those needed for fine resolutions (e.g., 100 GHz is needed for centimeter-scale resolutions), coherency can only be maintained for seconds. However, tens of minutes may be required to complete the angular looks.

To address this shortcoming, a modified SAR approach may be used based on using range-resolved reflection data instead of a chirped RF signal. This modified approach is a two-step process. First, the range-resolved reflection data is gathered. Second, this data is used to exactly construct a highly accurate approximation of the two-dimensional Fourier transform $G(k_x,k_y)$ of the target's scattering function. This approximation is more accurate than the I+jQ approximation in a conventional SAR.

Gathering the range-resolved reflection data may be accomplished by using a spread-spectrum approach instead of a simple frequency chirp. At each angular look of the target, range-resolved reflections may be obtained from scatterers within the target. The range-resolved reflections may be generated, for example, by imposing a spread-spectrum code-division multiple access (CDMA) coding on a carrier. More specifically, an M code signal may be coded onto the carrier by changing the phase 0 or π degrees. As an example, the phase may be changed at 10 GHz on a 100 GHz carrier using an M code with N separate bits. The returned signal may be correlated with a delayed version of the transmitted signal. If the delay time is exactly the same as the round trip time of the returned signal, the correlation is N. If the delay time is off by a time of at least ½B, the correlation is −1. If the delay time is off by <½B, the correlation is proportionally between N and −1. Thus, the range of a reflector can be determined with resolution of c/2B. This notional CDMA-SAR can theoretically have 1.5 cm resolution, which is better than any conventional SAR.

In addition to CDMA coding, other spread-spectrum frequency techniques can be equivalently used to determine range-resolved reflection data. All different spread spectrum approaches with equivalent bandwidth will lead to equivalent range-resolved reflection data.

Once the range-resolved data at an angular look is obtained, the Fourier transform of the image $G(k_x,k_y)$ may be synthetically constructed mathematically. As an example of direct Fourier inversion, a radial Fourier transform may be performed at each of the angular views, and an angular Fourier transform may then be performed as more views are collected. This builds the image as the views are conducted. As an example of a non-direct Fourier inversion, the Fourier transform may be inverted via in iterative scheme such as the Maximum Entropy Method which, through iteration, fills in the values of $G(k_x,k_y)$ that were not directly measured with their most likely value (based on maximum entropy).

Graphs 300 and 400 of FIGS. 3 and 4 illustrate what is meant by range-resolved scattering information along each angular view. The basic idea is that there is a target patch to be imaged with a local x-y coordinate system. From some distance, scatters are interrogated within the patch (denoted as reflectors A, B, C, and D in FIG. 3) by series of RF signals, while traveling in a line offset s from the patch (the line can also be curved, with no change in the results). Each interrogation occurs at an angle θ relative to the x-axis and consists of looking at reflections from these scatters. For the interrogation angle shown in graph 300 of FIG. 3, the returns from reflectors A and B arrive at the receive antenna at the same time, and are preceded by signals from reflector D and then and then reflector C. As the angle θ varies, the relative spacing of the reflectors varies. Assuming the interrogation locations move to the left, reflectors B and C are next seen at the same range. Finally, B and D, as well as A and C, are seen as equidistant.

"Fast time" and "slow time" are considered, or that both the transmission and receiving locations are fixed for each chirp (i.e., the time it takes to chirp the frequency and to receive the signal leads to a negligible motion of the transmit and receive antenna). The Fourier transform of the reflection function G is approximated from the reflection data at each angular view θ by $$G_{approx}(k, \theta) = \sum_n \frac{A_n}{R_n^2} e^{jk\delta_n} \tag{7}$$

where $A_n$ is the amplitude returned for range bin n, $R_n$ is the distance to range bin n, and $\delta_n = R_n - R_0$, where $R_0$ is defined as the distance to the center of the patch. This approximate function is then inverted by using Eq. (5).

Fourier transforming the phase offset over angular positions interferometrically determines the reflector's (x,y) coordinates. Importantly, the analysis of some embodiments does not require that the RF phase fronts are parallel at the location of the target. The range-resolved approach eliminates phase drifts that lead to image distortion in conventional SARs.

This approach requires $O(N^4)$ operations even when an analytic form is used for the frequency integration. However, this approach has significant advantages. These include, but are not limited to, eliminating the requirement for long coherency times (especially easing issues for very high-frequency SARs), eliminating phase drift and errors associated with frequency de-ramping, eliminating issues associated with non-parallel RF phase fronts at the target location, the ability to use the raw data as a mask to sharpen the SAR-produce image, and smaller computer memory requirements because each angular view data set is only sequentially needed and can be discarded once it is added to the image being processed.

While this modified SAR approach addresses long coherency times, phase drift in the image, and non-parallel RF phase fronts, it still requires enough signal reflected from the target to decode the spread-spectrum coding to determine the range-resolved reflection data. Accordingly, an improved approach to SAR imaging may be beneficial.

SUMMARY

Certain embodiments of the present invention may provide solutions to the problems and needs in the art that have not yet been fully identified, appreciated, or solved by conventional SAR solutions, or by the modified SAR approach using spread-spectrum techniques to gather range-resolved reflection data. For example, some embodiments of the present invention pertain to bi-static and mono-static SAR imaging using a short-pulse laser. While lasers have been used for ranging and for laser SAR, they have not been used for gathering range-resolved reflection data for generating an image. Range-resolved reflection data may be directly obtained in some embodiments using a short-pulse laser.

A short-pulse laser with the same bandwidth as spread-spectrum RF pulse may provide range information with equivalent resolution. For example, a laser pulse with a pulse length of 100 picoseconds has a 10 GHz bandwidth and can provide equivalent ranging information to a 10 GHz spread-spectrum pulse. A modified SAR approach based on range-resolved reflection data using a short pulse laser has advantages over a similar system gathering the range data with a spread-spectrum approach for very low signal-to-noise configurations and for imaging very distant targets.

One advantage of gathering the range information with a short-pulse laser is that more power can be focused on the target for the same power transmitter and size of transmitter optics. The illumination intensity at a distance R is given by $$I = (4P/\pi)(A/1.222R)^2 \tag{8}$$

where P is the transmitted power, λ is the wavelength of the transmitted power, and A is the size of the transmitting aperture. Small wavelengths lead to increased illumination intensity on the target. The increased number of photons on target scales as I/λ, or inversely proportional to the wavelength for a fixed transmitted power and aperture size. Increasing the number of photons on the target is important for cases where there is low signal-to-noise on the reflection data, especially for very distant targets.

Another advantage of gathering the range information with a short-pulse laser is that individual photons that are reflected by the target can be detected, and each one can by itself provide range information on reflections within the target. In contrast, using correlations of a spread-spectrum coding to gather range data requires that the entire code is unambiguously received for each reflection, requiring a number of photons on the order of 100 times the number of code chips, or 1,500 photons for a 15-chip spread-spectrum code. In comparison, a short-pulse laser would require receiving only one photon for the same information, a factor of 1500 less.

In an embodiment, a method includes periodically transmitting short-pulse laser bursts for a predetermined period of time over an interrogation path, by a transmitter, and receiving individual photons reflected from a target during each short pulse laser burst, by a receiver. The method also includes building up an image from range information generated over the interrogation path by integrating one photon at a time, by a computing system.

In another embodiment, a method includes periodically transmitting short-pulse laser bursts for a predetermined period of time over an interrogation path, by a transmitter, and receiving individual photons reflected from a target during each short pulse laser burst, by a mono-static receiver at a same location as the transmitter. The method also includes identifying range-resolved reflection data along each angular view of a plurality of angular views using the received individual photons, by the computing system, and separating the range-resolved reflection data into n bins, by the computing system. A return from bin n is separated in time from a return at a center of a target patch at (x,y)=(0,0) and is given by 2nΔs/c, where Δs is a width of each bin, and bin number n=0 includes reflections from the target center. The method further includes approximating a reflection function from reflection data at each of a plurality of angular views, by the computing system, and reconstructing the approximate reflection function using inversion, by the computing system, thereby building up an image from range information generated over the interrogation path by integrating one photon at a time.

In yet another embodiment, a method includes periodically transmitting short-pulse laser bursts for a predetermined period of time over an interrogation path, by a transmitter, and receiving individual photons reflected from a target during each short pulse laser burst, by a bi-static receiver at a different location than the transmitter. The method also includes identifying range contours corresponding to positions with equivalent range for range-resolved scattering amplitudes, by the computing system, and separating range-resolved data into n bins, by the computing system. The method further includes approximating a target function and a reflection function, by the computing system, and reconstructing the reflection function via inversion, by the computing system, thereby building up an image from range information generated over the interrogation path by integrating one photon at a time.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to bi-static and mono-static SAR imaging using a short-pulse laser. At each angular look of the target, range-resolved reflections may be obtained from scatterers within the target. The range-resolved reflections may be generated, for example, by using the short-pulse laser.

Figure 1:
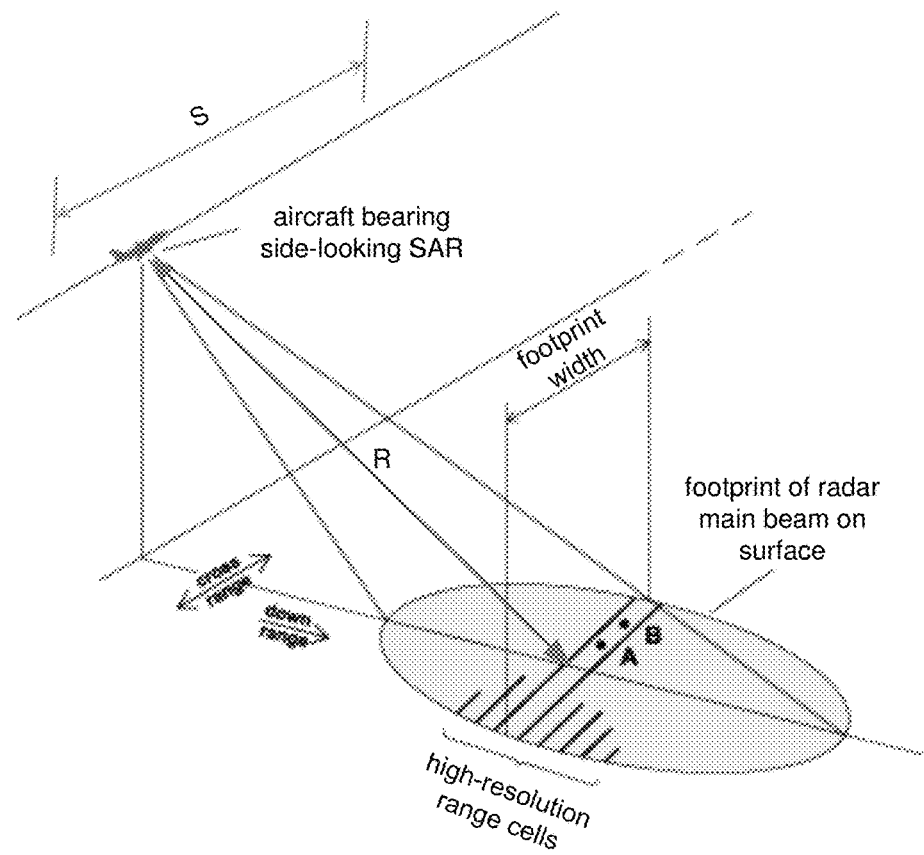
FIG. 1 is a schematic diagram illustrating spotlight-mode SAR parameters and definitions.
Figure 2:
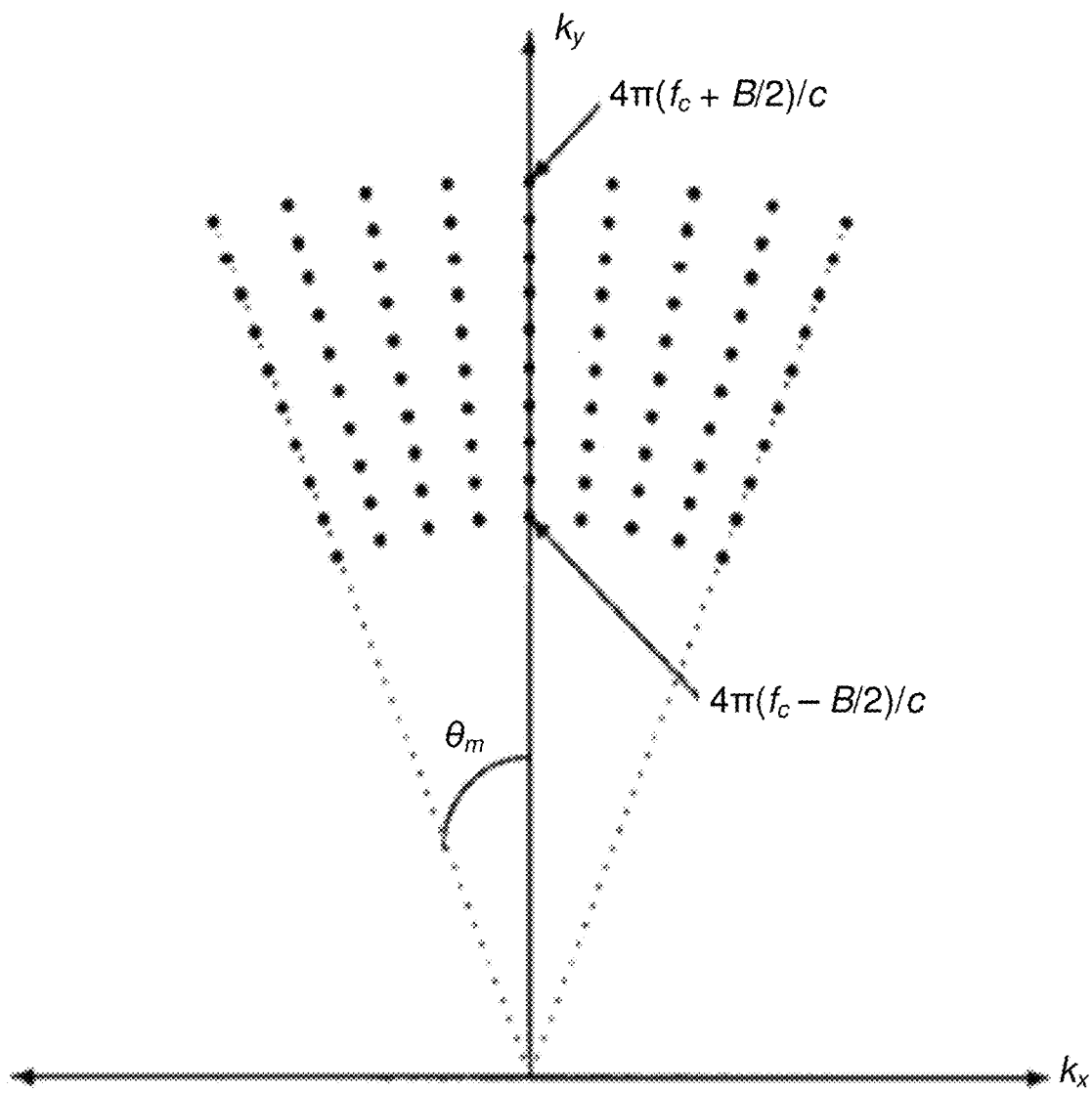
FIG. 2 is a graph illustrating Fourier domain locations for received information for a case with nine angular views and ten transmitted frequencies.
Figure 3:
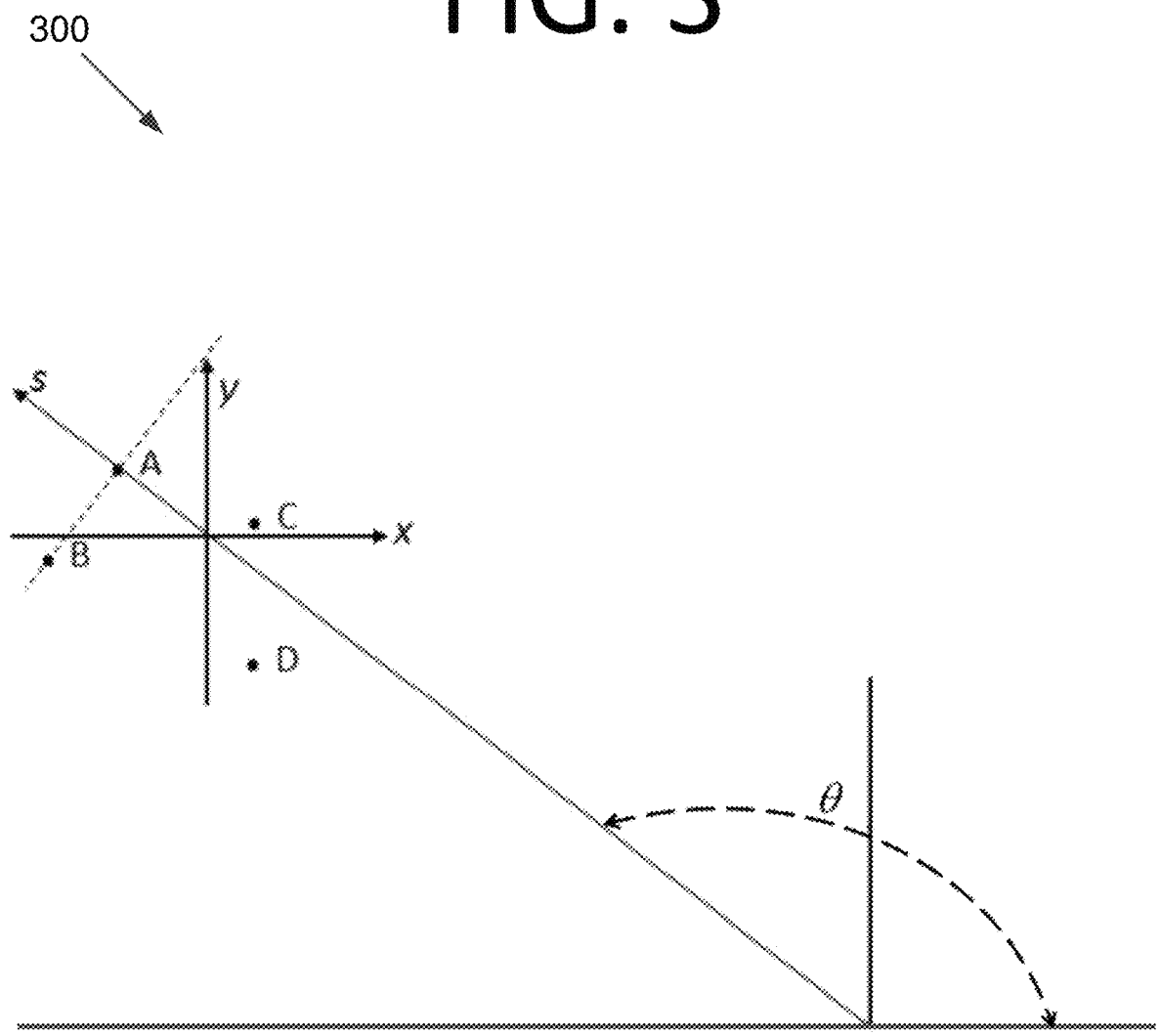
FIG. 3 is a graph illustrating notional reflectors in a target with reflection coefficient R.
Figure 4:
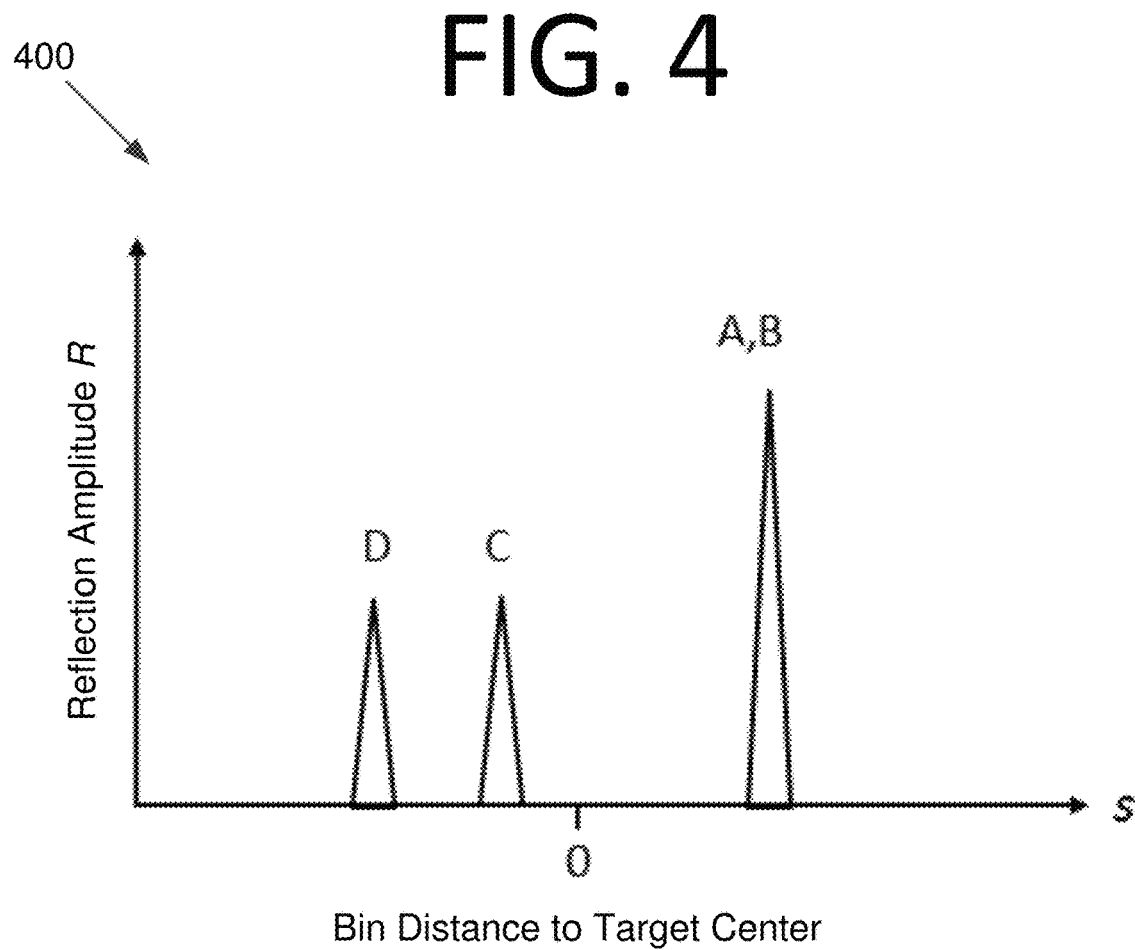
FIG. 4 is a graph illustrating range-resolved data corresponding to reflectors A, B, C, and D for a specific view angle $\theta$.
Figure 5:
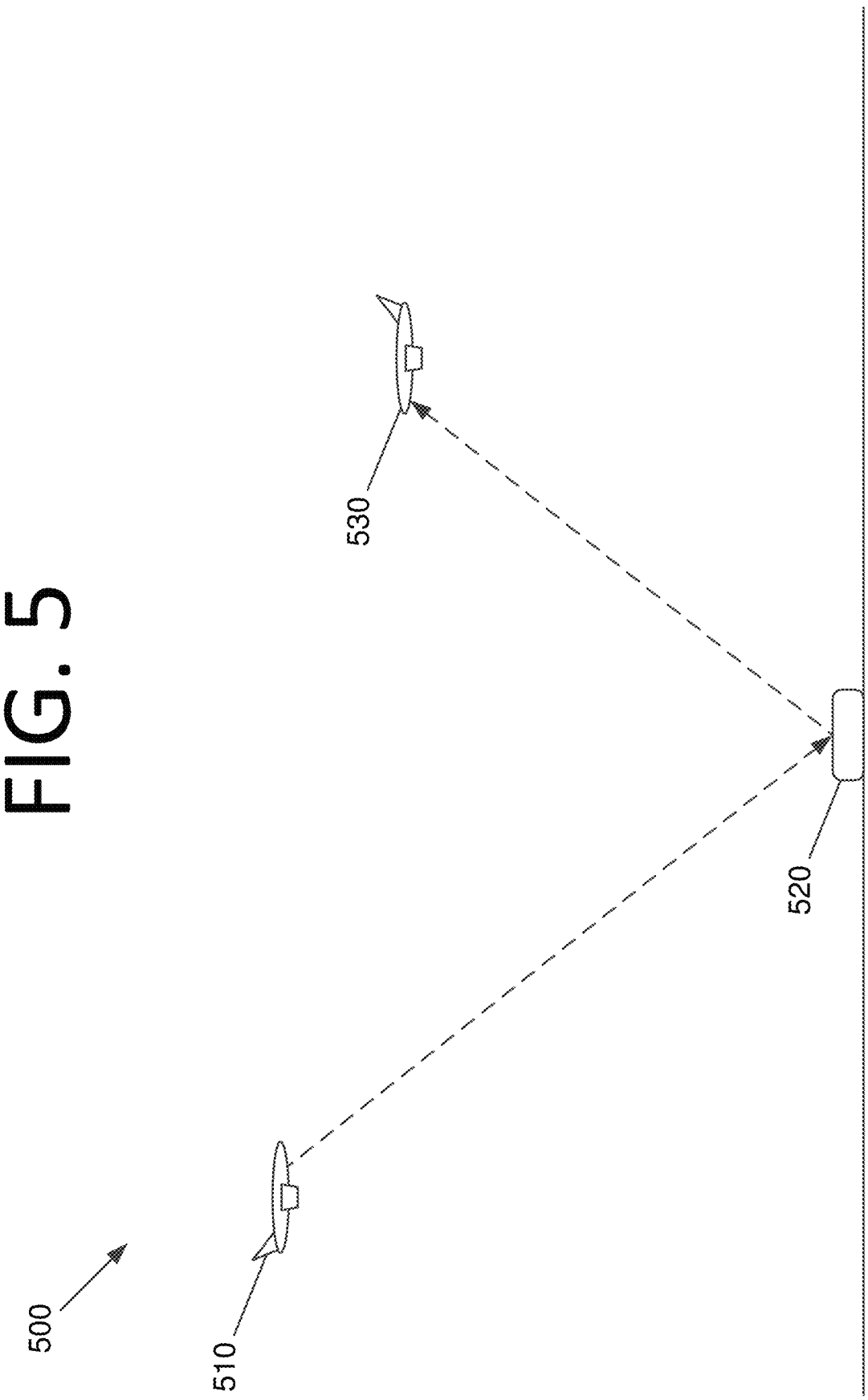
FIG. 5 is an architectural view illustrating a hybrid SAR system, according to an embodiment of the present invention.

Consider an example implementation, including a transmitter laser in motion on an aircraft 510, a stationary distant target 520, and a receiver on another aircraft 530 along an interrogation path, as shown in hybrid SAR system 500 of FIG. 5. While the receiver is shown as part of an aircraft 530 in this embodiment, in other embodiments, the receiver may or may not be stationary (e.g., a ground receiver, a hovering helicopter, etc.). Alternatively, the transmitter laser may be stationary and the receiver may be in motion. Any combination of stationary/moving transmitters and receivers may be employed without deviating from the scope of the invention, so long as at least one of the transmitter, receiver, or target is in motion relative to the others.

In addition to a laser, transmitter aircraft 510 includes a transmitter telescope and adaptive optics. Receiver aircraft 530 includes a receiver telescope and a photodetector.

The transmitter laser of transmitter aircraft 510 emits short pulses of pulse length r separated by intervals. Knowing the position of the transmitter and the receiver and the timing of the emitted laser pulse gives the range distance of a reflector in the target to an accuracy of c/2 τ by observing the time that a reflected photon is received at the detector. Transmitter aircraft 510 and receiver aircraft 530 would share position information that is determined by respective global positioning systems (GPSs), and/or receive this information from satellites, ground stations, and/or any other suitable positioning technology without deviating from the scope of the invention. The intervals between pulses should to be long enough so photons from different pulses cannot be received at the same time. In other words, the received photons from different pulses, or bursts, do not overlap in time, where from time $t_0$ to $t_1$, photons from a first pulse would be received, from $t_1$ to $t_2$, photons from a second pulse would be received, etc.

A minimum number of photons received per pixel ($N_{pixel}$) of approximately 100 is needed for a fair image in some embodiments. For a 100×100 pixel image, approximately $10^6$ total received photons may be needed in some embodiments. At this level, receiver dark counts are negligible.

Solar photons reflecting off target 520 may be the leading cause of noise, requiring $N_{pixel} > N_{solar}$, where $N_{solar}$ is the number of solar photons received per pixel. Low laser repetition rates, while maintaining the average laser power, can make the effect from solar photons negligible by allowing the receiver to be time gated.

Mono-Static SAR Scheme

In the SAR scheme of some embodiments, unlike the receiver of aircraft 530 of FIG. 5, location of the receiver is at the same location as the transmitter. In other words, for aircraft-based implementations, both the transmitter and receiver would be on that aircraft. In this case, the Fourier transform of the reflection function G is approximated from the reflection data at each angular view $\theta$ by $$G_{approx}(k, \theta) = \sum_n \frac{A_n}{R_n^2} e^{jk\delta_n} \qquad (9)$$

where $A_n$ is the amplitude returned for range bin n, $R_n$ is the distance to range bin n, and $\delta_n = R_n - R_0$, where $R_0$ is defined as the distance to the center of the patch. This approximate reflection function is then inverted by using $$f(x, y) = \frac{1}{2\pi} \int_{\pi/2-\theta_0}^{\frac{\pi}{2}\mp} G(k, \theta) e^{-jk\delta_{xy}} k\, dk\, d\theta \qquad (10)$$

where $\delta_{xy} = R_{xy} - R_0$ and $R_{xy}$ is the distance from the transmitter/receiver to the point (x,y).

While Fourier inversion is used in this example, it should be noted that other inversion techniques may be used. For instance, the Maximum Entropy Method may be used to perform image reconstruction. This is a deconvolution algorithm that functions by minimizing a smoothness function (i.e, entropy) in an image. However, any suitable inversion technique may be used without deviating from the scope of the invention.

Bi-Static Sar Scheme

The mono-static SAR scheme is modified for a bi-static geometry (where the receiver is at a different position than the transmitter, as shown in FIG. 5) by changing $\delta_n$ to be the total distance from the transmitter to reflector and then to the receiver, $R_0$ as the total distance from the transmitter to the center of the target and then to the receiver, and $\delta_{xy}$ as the total distance from the transmitter to the point (x,y) and then to the receiver.

For a photon-starved system, the image can be generated incrementally as each photon is detected by the receiver. Alternatively, received photons can be accumulated over some time interval and the function $G_{approx}(k,\theta)$ can be created from a summation from different photons over that time interval. However, as with mono-static SAR schemes, it should also be noted that any suitable inversion technique may be used without deviating from the scope of the invention.

Figure 6:
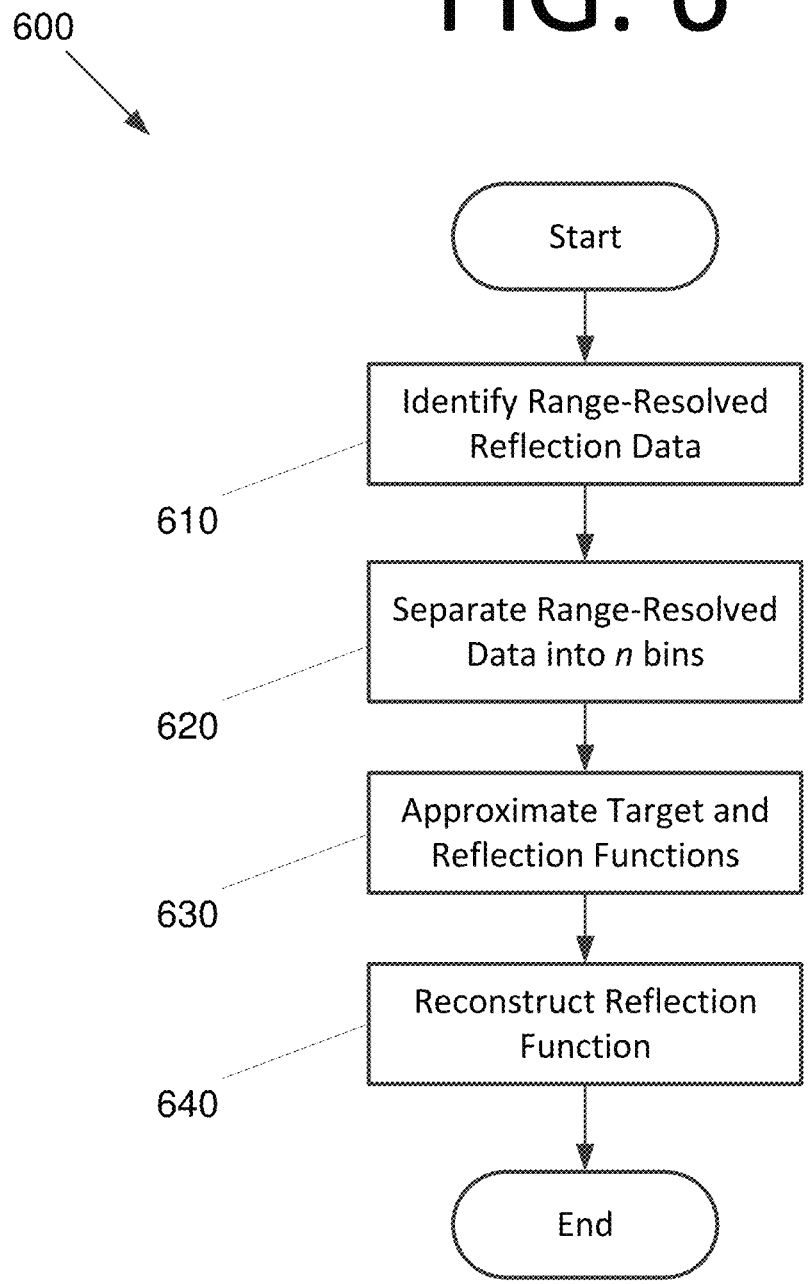
FIG. 6 is a flowchart illustrating a process for performing mono-static SAR, according to an embodiment of the present invention.

FIG. 6 is a flowchart 600 illustrating a process for performing mono-static SAR, according to an embodiment of the present invention. The process begins with identifying range-resolved reflection data along each angular view at 610. Range-resolved data is separated into n bins at 620. The return from bin n is separated in time from the return at the center of the target patch at (x,y)=(0,0) and is given by 2n$\Delta$s/c, where $\Delta$s is the width of each bin, and bin number n=0 includes reflections from the target center. The target function and reflection function are approximated at 630. The reflection function is then reconstructed, by Fourier inversion, at 640.

Figure 7:
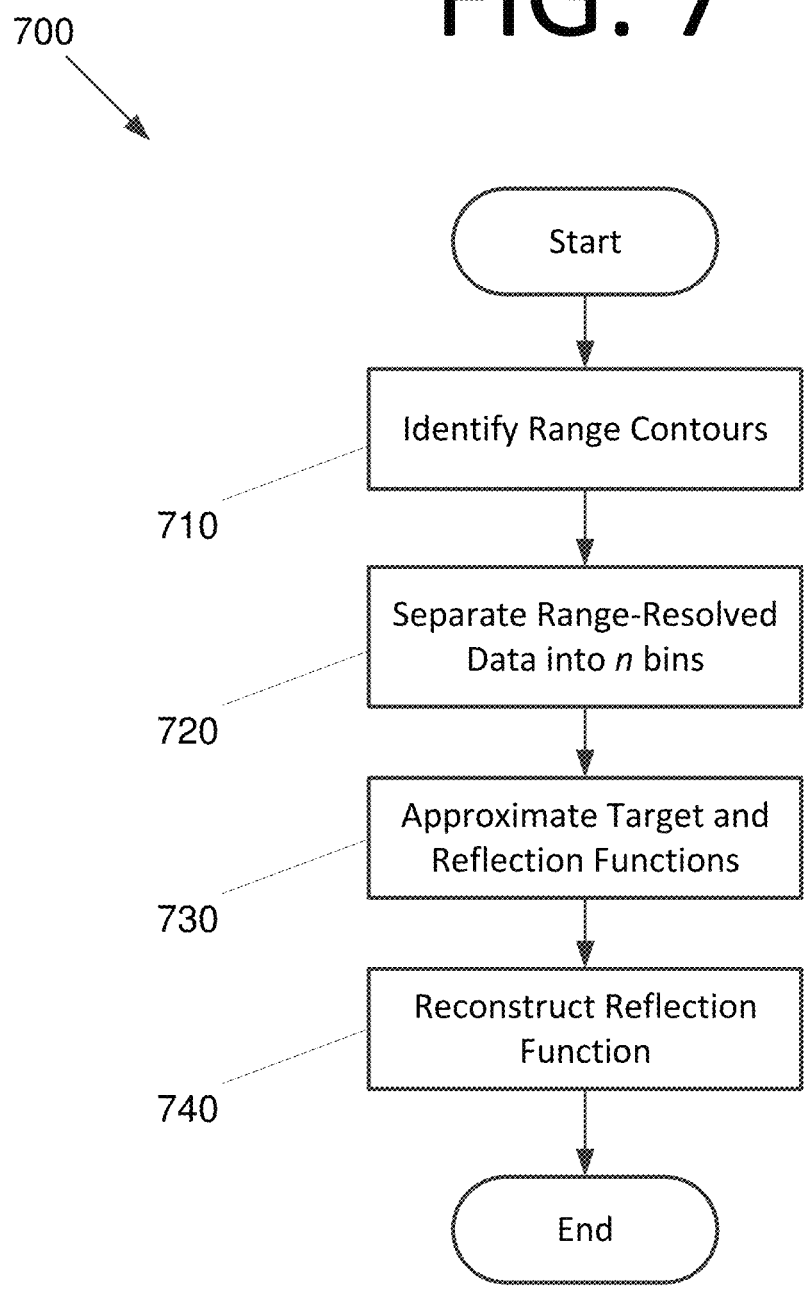
FIG. 7 is a flowchart illustrating a process for performing bi-static SAR, according to an embodiment of the present invention.

FIG. 7 is a flowchart 700 illustrating a process for performing bi-static SAR, according to an embodiment of the present invention. The process begins with identifying range contours corresponding to positions with equivalent range for the range-resolved scattering amplitudes at 710. Range-resolved data is separated into n bins at 720. The target function and reflection function are approximated at 730. The reflection function is then reconstructed, by Fourier inversion, at 740.

Figure 8:
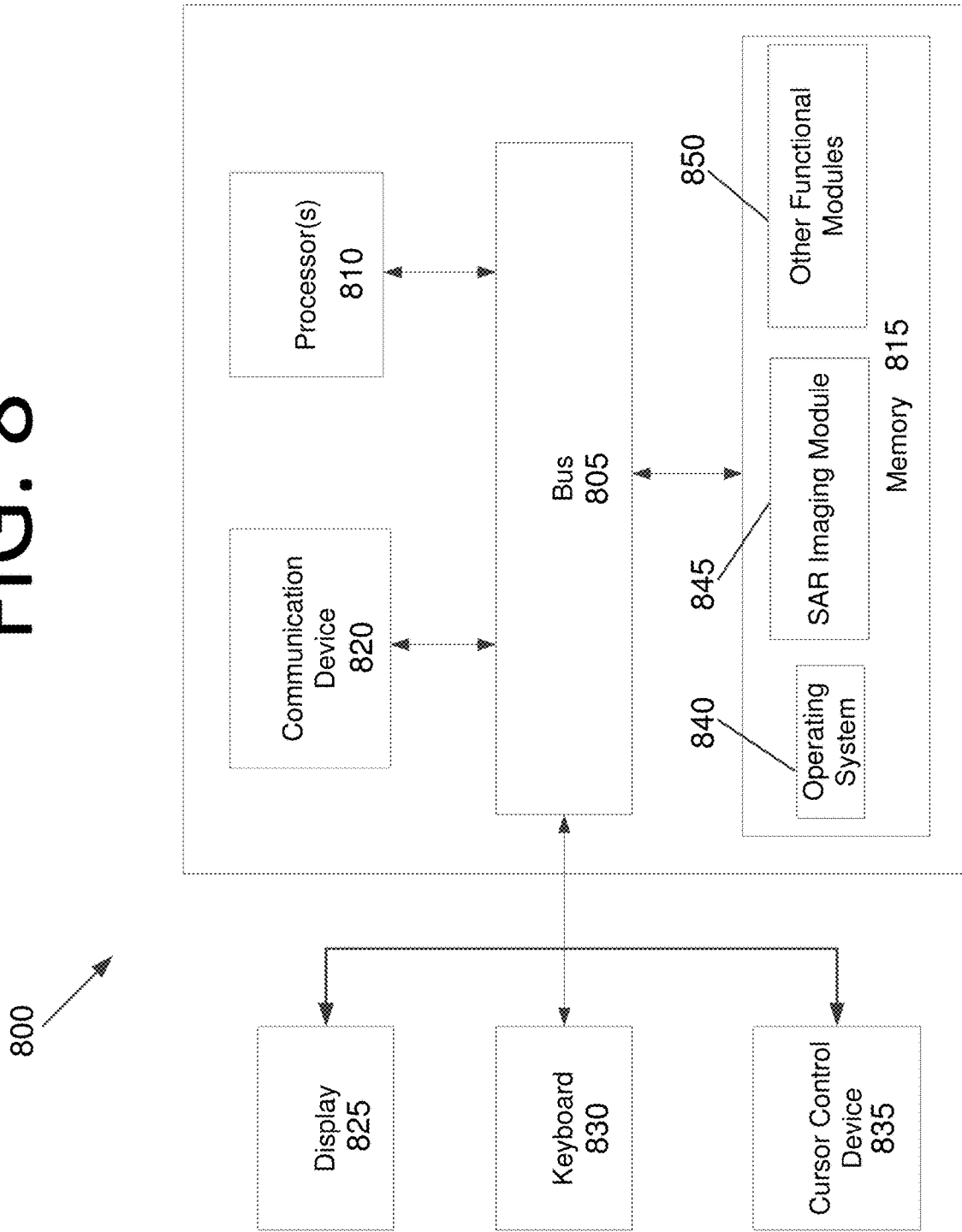
FIG. 8 is a block diagram illustrating a computing system configured to perform mono-static and/or bi-static SAR imaging using a short-pulse laser, according to an embodiment of the present invention.

FIG. 8 is a block diagram illustrating a computing system 800 configured to perform mono-static and/or bi-static SAR imaging using a short-pulse laser, according to an embodiment of the present invention. Computing system 800 includes a bus 805 or other communication mechanism for communicating information, and processor(s) 810 coupled to bus 805 for processing information. Processor(s) 810 may be any type of general or specific purpose processor, including a central processing unit (CPU) or application specific integrated circuit (ASIC). Processor(s) 810 may also have multiple processing cores, and at least some of the cores may be configured to perform specific functions. Multi-parallel processing may be used in some embodiments. Computing system 800 further includes a memory 815 for storing information and instructions to be executed by processor(s) 810. Memory 815 can be comprised of any combination of random access memory (RAM), read only memory (ROM), flash memory, cache, static storage such as a magnetic or optical disk, or any other types of non-transitory computer-readable media or combinations thereof. Additionally, computing system 800 includes a communication device 820, such as a transceiver and antenna, to wirelessly provide access to a communications network.

Non-transitory computer-readable media may be any available media that can be accessed by processor(s) 810 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 810 are further coupled via bus 805 to a display 825, such as a Liquid Crystal Display (LCD), for displaying information to a user. A keyboard 830 and a cursor control device 835, such as a computer mouse, are further coupled to bus 805 to enable a user to interface with computing system. However, in certain embodiments such as those for mobile computing implementations, a physical keyboard and mouse may not be present, and the user may interact with the device solely through display 825 and/or a touchpad (not shown). Any type and combination of input devices may be used as a matter of design choice.

Memory 815 stores software modules that provide functionality when executed by processor(s) 810. The modules include an operating system 840 for computing system 800. The modules further include a SAR imaging module 845 that is configured to perform SAR perform mono-static and/or bi-static SAR imaging using a short-pulse laser via any of the approaches discussed herein or derivatives thereof. Computing system 800 may include one or more additional functional modules 850 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 6 and 7 may be performed by a computer program, encoding instructions for the nonlinear adaptive processor to perform at least the processes described in FIGS. 6 and 7, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 6 and 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:
periodically transmitting short-pulse laser bursts for a predetermined period of time over an interrogation path, by a transmitter;
receiving individual photons reflected from a target during each short pulse laser burst, by a receiver; and
building up, by a computing system, a Fourier image from range information generated over the interrogation path by integrating one photon at a time without using a heterodyne receiver, wherein
each photon providing range information on reflections from the target, the range information being derived from a time lapse, the time lapse being a duration between a time the photon is transmitted to the target as part of a short laser pulse to a time the photon is received after reflecting back from the target; and
incrementally contributing, using the range information, to the Fourier image an amount equal to an amplitude of a return signal divided by range distance squared, multiplied by $e^{jk\delta_n}$, where e is Euler's number, j is the square root of minus 1, k is a wave number defined by $2\pi$ divided by frequency, and $\delta_n$ is the difference in traversed distance between reflected photon n and a photon that reflects from the center of the target, and a Fourier inversion back to a reflection image includes frequency integration from a minimum frequency of zero to a maximum frequency equal to 1 over a timing resolution of each short pulse.

2. The method of claim 1, wherein the receiver is a mono-static receiver at a same location as the transmitter.

3. The method of claim 2, wherein the building up of the image comprises:
identifying range-resolved reflection data along each angular view of a plurality of angular views using the received individual photons, by the computing system;
separating the range-resolved reflection data into n bins, by the computing system, wherein a return from bin n is separated in time from a return at a center of a target patch at (x,y)=(0,0) and is given by $2n\Delta s/c$, where $\Delta s$ is a width of each bin, and bin number n=0 includes reflections from the target center;

approximating a reflection function from reflection data at each of a plurality of angular views, by the computing system; and reconstructing the approximate reflection function using inversion, by the computing system.

4. The method of claim 3, wherein
the approximating of the reflection function from reflection data at each angular view Bis given by:

$$G_{approx}(k, \theta) = \sum_n \frac{A_n}{R_n^2} e^{jk\delta_n}$$

where $A_n$ is an amplitude returned for range bin n, $R_n$ is a distance to range bin n, and $\delta_n = R_n - R_0$, where $R_0$ is defined as a distance to a center of a patch; and the inverting of the approximate reflection function is performed using:

$$f(x, y) = \frac{1}{2\pi} \int_{\pi/2-\theta_0}^{\frac{\pi}{2} \mp} G(k, \theta) e^{-jk\delta_{xy}} k dk d\theta$$

where $\delta_{xy} = R_{xy} - R_0$ and $R_{xy}$ is a distance from the transmitter and the mono-static receiver to a point (x,y).

5. The method of claim 1, wherein the receiver is a bi-static receiver at a different location than the transmitter.

6. The method of claim 5, wherein the bi-static receiver is stationary.

7. The method of claim 5, wherein the building up of the image comprises:

identifying range contours corresponding to positions with equivalent range for range-resolved scattering amplitudes, by the computing system;

separating range-resolved data into n bins, by the computing system;

approximating a target function and a reflection function, by the computing system; and reconstructing the reflection function via inversion, by the computing system.

8. The method of claim 5, wherein the periodically transmitting of the short-pulse laser bursts over the interrogation path occurs from a fixed transmitter location as the receiver moves along an interrogation path.

9. The method of claim 5, wherein the transmitter is located on a first aircraft and the bi-static receiver is located on a second aircraft.

10. The method of claim 1, wherein a pulse length and a bandwidth of the short pulse laser bursts are 100 picoseconds and 10 GHz, respectively.

11. The method of claim 1, wherein intervals between the short pulse laser bursts are sufficiently long such that photons received from different bursts do not overlap in time.

12. The method of claim 1, wherein a number of individual photons $N_{pixel}$ that are received per pixel to build up the image is between 100 and 125.

13. The method of claim 1, wherein a number of individual photons $N_{pixel}$ that are received per pixel to build up the image is greater than number of solar photons $N_{solar}$ that are received per pixel.

14. A method, comprising:
periodically transmitting short-pulse laser bursts for a predetermined period of time over an interrogation path, by a transmitter;

receiving individual photons reflected from a target during each short pulse laser burst, by a mono-static receiver at a same location as the transmitter;

identifying range-resolved reflection data along each angular view of a plurality of angular views using the received individual photons, by the computing system;

separating the range-resolved reflection data into n bins, by the computing system, wherein a return from bin n is separated in time from a return at a center of a target patch at (x,y)=(0,0) and is given by 2nΔs/c, where Δs is a width of each bin, and bin number n=0 includes reflections from the target center;

approximating a reflection function from reflection data at each of a plurality of angular views, by the computing system; and reconstructing the approximate reflection function using inversion, by the computing system, wherein the reconstructing of the reflection function comprises
building up an image from range information generated over the interrogation path by integrating one photon at a time without using a heterodyne receiver, each photon providing range information on reflections from the target, the range information being derived from a time lapse, the time lapse being a duration between a time the photon is transmitted to the target as part of a short laser pulse to a time the photon is received after reflecting back from the target, and incrementally contributing, using the range information, to the Fourier image an amount equal to an amplitude of a return signal divided by range distance squared, multiplied by $e^{jk\delta_n}$, where e is Euler's number, j is the square root of minus 1, k is a wave number defined by $2\pi$ divided by frequency, and $\delta_n$ is the difference in traversed distance between reflected photon n and a photon that reflects from the center of the target, and a Fourier inversion back to a reflection image includes frequency integration from a minimum frequency of zero to a maximum frequency equal to 1 over a timing resolution of each short pulse.

15. The method of claim 14, wherein
the approximating of the reflection function from reflection data at each angular view Bis given by:

$$G_{approx}(k, \theta) = \sum_n \frac{A_n}{R_n^2} e^{jk\delta_n}$$

where $A_n$ is an amplitude returned for range bin n, $R_n$ is a distance to range bin n, and $\delta = R_n - R_0$, where $R_0$ is defined as a distance to a center of a patch; and the inverting of the approximate reflection function is performed using:

$$f(x, y) = \frac{1}{2\pi} \int_{\pi/2-\theta_0}^{\frac{\pi}{2} \mp} G(k, \theta) e^{-jk\delta_{xy}} k dk d\theta$$

where $\delta_{xy} = R_{xy} - R_0$ and $R_{xy}$ is a distance from the transmitter and the mono-static receiver to a point (x,y).

16. The method of claim 14, wherein a pulse length and a bandwidth of the short pulse laser bursts are 100 picoseconds and 10 GHz, respectively.

17. The method of claim 14, wherein intervals between the short pulse laser bursts are sufficiently long such that photons received from different bursts do not overlap in time.

18. A method, comprising:
periodically transmitting short-pulse laser bursts for a predetermined period of time over an interrogation path, by a transmitter;
receiving individual photons reflected from a target during each short pulse laser burst, by a bi-static receiver at a different location than the transmitter;
identifying range contours corresponding to positions with equivalent range for range-resolved scattering amplitudes, by the computing system;
separating range-resolved data into n bins, by the computing system;
approximating a target function and a reflection function, by the computing system; and
reconstructing the reflection function via inversion, by the computing system, wherein
the reconstructing of the reflection function comprises building up a Fourier image from range information generated over the interrogation path by integrating one photon at a time without using a heterodyne receiver, each photon providing range information on reflections from the target, the range information being derived from a time lapse, the time lapse being a duration between a time the photon is transmitted to the target as part of a laser pulse to a time the photon is received after reflecting back from the target, and
incrementally contributing, using the range information, to the Fourier image an amount equal to an amplitude of a return signal divided by range distance squared, multiplied by $e^{jk\delta_n}$, where e is Euler's number, j is the square root of minus 1, k is a wave number defined by $2\pi$ divided by frequency, and $\delta_n$ is the difference in traversed distance between reflected photon n and a photon that reflects from the center of the target, and a Fourier inversion back to a reflection image includes frequency integration from a minimum frequency of zero to a maximum frequency equal to 1 over a timing resolution of each short pulse.

19. The method of claim 18, wherein the periodically transmitting of the short-pulse laser bursts over the interrogation path occurs from a fixed transmitter location as the receiver moves along an interrogation path.

20. The method of claim 18, wherein intervals between short pulse laser bursts are sufficiently long such that photons from different bursts do not overlap.

* * * * *